US006875003B2

(12) United States Patent
Aono

(10) Patent No.: US 6,875,003 B2
(45) Date of Patent: Apr. 5, 2005

(54) ROTOR AND MOLDING DIE FOR ROTOR

(75) Inventor: Yusuke Aono, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 29 days.

(21) Appl. No.: 10/373,792

(22) Filed: Feb. 27, 2003

(65) Prior Publication Data

US 2003/0189379 A1 Oct. 9, 2003

(30) Foreign Application Priority Data

Apr. 3, 2002 (JP) ....................................... 2002-101158

(51) Int. Cl.[7] ................................................ B29C 45/14
(52) U.S. Cl. ........................................ 425/116; 425/125
(58) Field of Search .................................. 425/116, 125

(56) References Cited

U.S. PATENT DOCUMENTS 1,925,892 A * 9/1933 Apple et al. ............. 264/272.2
2,019,064 A * 10/1935 Apple et al. ............. 425/129.1
2,058,938 A * 10/1936 Apple et al. ............. 264/272.2
4,362,490 A * 12/1982 Machida et al. ............ 425/128
4,950,438 A * 8/1990 Nakamura et al. ....... 264/272.2
5,584,114 A * 12/1996 McManus ................ 264/272.2
5,634,258 A * 6/1997 Onodera et al. ......... 264/272.2

FOREIGN PATENT DOCUMENTS

JP 61-150656 7/1986
JP 63099751 A * 5/1988 ........... B29C/45/14

* cited by examiner

*Primary Examiner*—Robert B. Davis
(74) *Attorney, Agent, or Firm*—Armstrong, Kratz, Quintos, Hanson & Brooks, LLP

(57) ABSTRACT

A rotor 1 can prevent from cracking a magnet when molding the rotor and a molding die for the rotor can prevent from reducing yield of rotors. The rotor 1 formed into disk shape includes a rotor body 12 and an annular shape magnet 13. The rotor body 12 has inner and outer cover portions 18, 19 for covering respectively inner and outer surfaces **13*a*, 13*b* of the magnet 13, and first and second end cover portions 20, 21 for covering respectively one end face 13*c* and the other end face 13*d* of the magnet 13. The rotor 1 is formed by injection molding with the molding die, whose a cavity receives the magnet 13**.

3 Claims, 5 Drawing Sheets

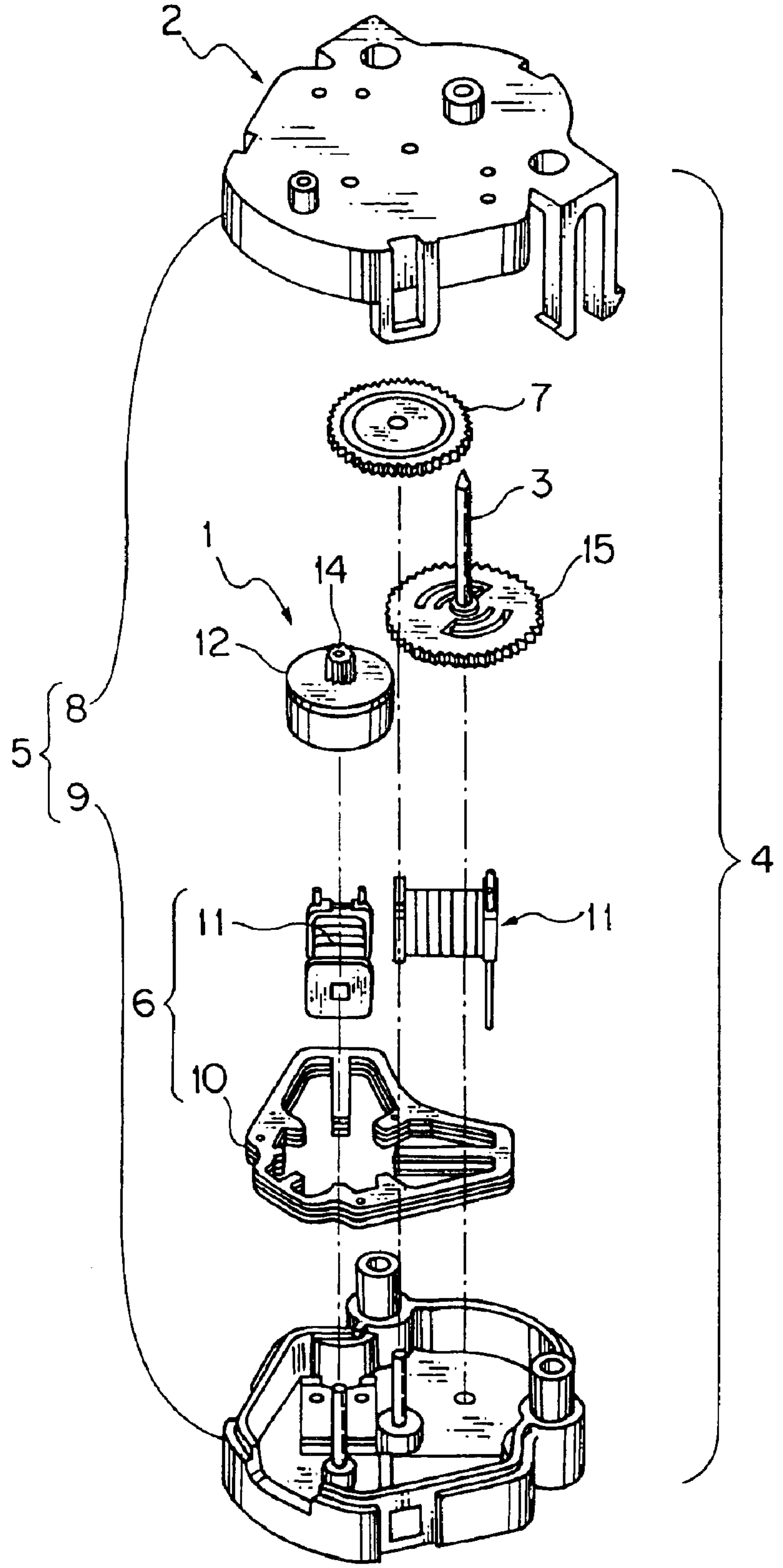
F I G. 10

ROTOR AND MOLDING DIE FOR ROTOR

BACKGROUND OF THE INVENTION

1. Field of the Invention

This invention relates to a rotor for rotating an output shaft of a motor and a molding die for molding the rotor to manufacture the rotor.

2. Description of the Related Art

A stepping motor has been used as an actuator in various office automation equipment, domestic electrical equipment or an automobile. For example, in a vehicle, a meter for a vehicle to indicate a measured value, such as vehicle speed or engine speed, is mounted. In the meter for a vehicle, a stepping motor is applied to drive a pointer disposed in front of a dial plate.

Such type of stepping motors have a meter body mounted on a printed circuit board in the meter and a output shaft projecting from the meter body to mount the pointer thereon. The meter body includes a case, a stator fixed in the case and a rotor 100 shown in FIG. 11. The case is formed into a thin flat box shape. The stator has a frame fixed in the case and a coil mounted on the frame.

The rotor 100, as shown in FIG. 11, includes a disc-shape rotor body 101 and an annular-shape magnet 102 disposed coaxially with the rotor body 101. The rotor body may be made of synthetic resin. The magnet 102 is fixed on the rotor body 101 so as to expose an outer surface 102*a* thereof.

The rotor 100 is formed by means of inserting the magnet 102 into a cavity of the molding die and injecting fluidized synthetic resin by heating with high pressure into the cavity. Thus, the rotor 100 is formed with injection molding. The rotor body, i.e. the rotor, is supported freely rotatably by the case. When the rotor body, i.e. the rotor, rotates, the output shaft rotates.

When current flows through the coil of the stepping motor structured as mentioned above, the frame is magnetized to generate a rotating magnetic field and the rotor 100 is rotated. Then, the output shaft is rated and a pointer is moved.

Ojects to be Solved

Regarding the above-mentioned rotor 100, the magnet 102 is exposed to the outer surface of the rotor body 101. Therefore, when the magnet 102 is inserted into the cavity of the molding die and synthetic resin fluidized by heating is injected into the cavity, the magnet 102 may be pushed in a direction from the inner surface to the outer surface by the synthetic resin. At the time, the synthetic resin fluidized by heating does not touch the outer surface of the magnet 102 so that the synthetic resin fluidized by heating does not push the outer surface of the magnet 102 toward the inner surface thereof. The pressure of the injected synthetic resin may reach 7 M Pa in such case.

When synthetic resin fluidized by heating is injected in the cavity, the synthetic resin pushes the magnet 102 from the inner surface thereof toward the outer surface thereof. Thereby, the magnet 102 is expanded outwardly, and if the worse comes to the worst, the magnet 102 is cracked. Thus, when the above-mentioned usual rotor 100 is molded, the magnet 102 may be cracked and the yield of manufacturing is apt to be reduced.

To overcome the above drawback of a usual rotor, objects of this invention are to provide a rotor which can prevent a magnet from cracking when molding the rotor so as to prevent the yield of manufacturing from being reduced and a molding die for a rotor which can prevent reducing the yield of rotors.

SUMMARY OF THE INVENTION

How to Attain the Object

In order to attain the objects, a rotor according to this invention is specialized in that the rotor for rotating an output shaft of a motor includes a rotor body made of synthetic resin, and a magnet formed into annular shape and magnetized and fixed on said rotor body, the rotor body having an inner cover portion for covering an inner surface of the magnet and an outer cover portion for covering an outer surface of the magnet.

In the rotor mentioned above, the inner surface of the magnet is covered by the inner cover portion of the rotor body and the outer surface of the magnet is covered by the outer cover portion of the rotor body. Thereby, when the rotor is molded, the synthetic resin fluidized by heating pushes the inner surface of the magnet outwardly and the outer surface of the magnet inwardly. Therefore, when the rotor is molded, the magnet is prevented from expanding or shrinking.

The rotor according to this invention, is further specialized in that the rotor body has an end-face cover portion continued to the inner cover portion and the outer cover portion for covering the end face of the magnet, in the above-mentioned rotor.

In the rotor mentioned above, the end face of the magnet is covered with the end-face cover portion of the rotor body. Thereby, when the rotor is molded, the synthetic resin fluidized by heating pushes the end face of the magnet so that the magnet can be prevented more securely from expanding or shrinking. Furthermore, the end-face cover portion is continued to the inner cover portion and the outer cover portion so that pressures pushing the inner, outer and end face of the magnet can be the same.

A molding die for molding a rotor according to this invention, the rotor including a rotor body made of synthetic resin, and a magnet formed into annular shape and magnetized and fixed on said rotor body, the rotor body having an inner cover portion for covering an inner surface of the magnet and an outer cover portion for an outer surface of the magnet, is specialized by that the molding die for molding the rotor for rotating an output shaft of a motor has a first molding die having a first molding surface opposing with a space to the inner surface of the magnet, and a second molding die having a second molding surface opposing with a space to the outer surface of the magnet, the second molding die including a support projection projecting from the second molding surface for supporting the magnet by abutting on the outer surface of the magnet in a cavity being surrounded by the first molding surface and the second molding surface.

In the molding die for molding the rotor mentioned above, the magnet is supported by the support projection of the second molding die in the cavity of the molding die. In the cavity, the first molding surface of the first molding die opposes with a space to the inner surface of the magnet, and the second molding surface of the second molding die opposes with a space to the outer surface of the magnet. Thereby, when the rotor is molded, the fluidized synthetic resin by heating pushes the inner surface of the magnet outwardly and the outer surface of the magnet inwardly. Therefore, when the rotor is molded, the magnet is prevented from expanding or shrinking.

The molding die for molding the rotor according to this invention, the rotor having an end-face cover portion continued to the inner cover portion and the outer cover portion for covering the end face of the magnet, is further specialized by that the first molding surface and the second molding surface oppose respectively with a space to one end face of the magnet, and further comprises a third molding die having a third molding surface opposing with a space to the other end face of the magnet in the above-mentioned molding die for molding the rotor.

In the molding die for molding the rotor mentioned above, the first molding surface and the second molding surface oppose with a space to the one end face of the magnet, and the third molding surface opposes with a space to the other end face of the magnet. Thereby, when molding the rotor, the fluidized synthetic resin by heating pushes the both end faces of the magnet so that the magnet can be prevented more securely from expanding or shrinking. The first molding surface and the second molding surface oppose with a space to the one end face of the magnet, and the third molding surface opposes with a space to the other end face of the magnet so that pressures pushing the inner and outer surfaces and end faces of the magnet can be the same when the rotor is molded.

The molding die for molding a rotor according to this invention, is further specialized by that the second molding die is formed into annular shape and provided at an inner surface thereof with the second molding surface and has adjusting means for increasing or decreasing an inner diameter of the second molding die in accordance with an outer diameter of the magnet in the above-mentioned molding die for molding the rotor.

In the molding die for molding a rotor mentioned above, the adjusting means increases or decreases the inner diameter of the second molding die in accordance with the outer diameter of the magnet. Thereby, when the outer diameter of the magnet is slightly changed by tolerance or the like, the magnet can be supported with the support projection in the cavity. In this case, the first, second and third molding surfaces have to have a space against the inner and outer surfaces and the both end faces. Thereby, when the rotor is molded, the magnet can be prevented more securely from expanding or shrinking.

The molding die for molding a rotor according to this invention, is further specialized by that an annular-shape supporting die, supporting the second molding die and being supported by the first molding die, is provided and the adjusting means has pushing means for pushing the supporting die toward the third molding die, a first tapered surface inclined upward so that an inner diameter of the supporting die gradually increases in proportion to approaching the third molding die on an inner surface of the supporting die, and a second tapered surface contacting with the first tapered surface and inclined upward so that an outer diameter of the second molding die gradually increases in proportion to approaching the third molding die on an outer surface of the second molding die in the above-mentioned molding die for molding the rotor.

In the molding die for molding the rotor mentioned above, the pushing means pushes the supporting die for supporting the second molding die toward the third molding die. The first tapered surface is inclined so as to increase the inner diameter of the supporting die gradually in proportion to approaching the third molding die on the inner surface of the supporting die. The second tapered surface contacting with the first tapered surface is inclined so as to increase the outer diameter of the second molding die gradually in proportion to approaching the third molding die on the outer surface of the second molding die.

Thereby, when the first molding die and the second molding die are fixed together, the second molding die is pushed so as to decrease the inner diameter of the second molding die by pushing force of the pushing means and the first and second tapered surfaces slant to above-mentioned directions. When the magnet is inserted into the second molding die, the support projection abuts on the outer surface of the magnet by reducing the inner diameter of the second molding die by pushing force of the pushing means. Therefore, even if the magnet is smaller than the space between the support projections, the magnet can be supported securely in the cavity.

If the magnet is larger than the space between the support projections, when the magnet is inserted into the space between the support projections, the inner diameter of the second molding die is increased against the pushing force of the pushing means because the first and second tapered surfaces are inclined toward the above-mentioned directions. Thus, even if the magnet is larger than the space between the support projections, the magnet can be supported securely in the cavity. Therefore, the adjusting means can securely increase or decrease the inner diameter of the second molding die in accordance with the outer diameter of the magnet.

The above and other objects and features of this invention will become more apparent from the following description taken in conjunction with the accompanying drawings.

BRIEF DESCRIPTION OF THE DRAWINGS

FIG. 10 is an exploded perspective view of the stepping motor shown in FIG. 9.

DESCRIPTION OF THE PREFERRED EMBODIMENT

An embodiment of a rotor according to this invention will be described with reference to FIGS. 1–10. The rotor shown in FIG. 1 structures a stepping motor 2 as a motor shown in FIGS. 9 and 10, and rotates an output shaft 3 of the stepping motor 2.

Figure 9:
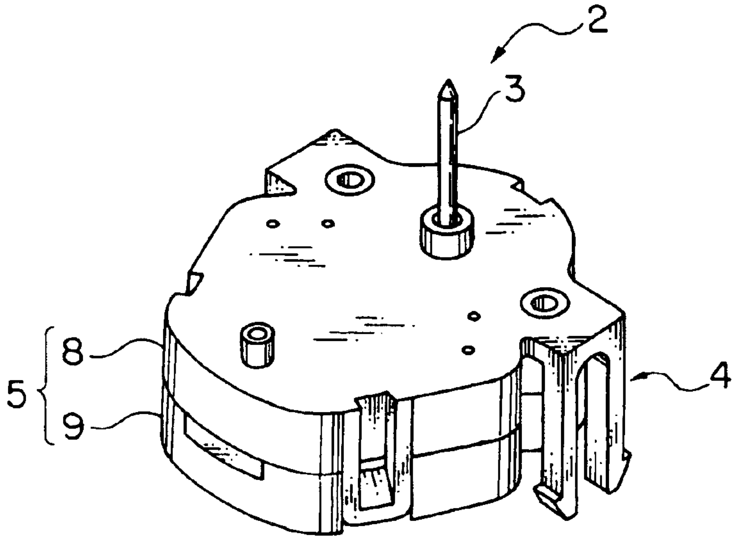
FIG. 9 is a perspective view of a stepping motor having the rotor shown in FIG. 1.

The stepping motor 2, as shown in FIGS. 9 and 10, includes a motor body 4 and the output shaft 3 projecting from the motor body 4. The motor body 4, as shown in FIG. 10, is provided with a case 5, a stator 6, the above-mentioned rotor 1 and a driven gear. The case 5 has a top case 8 and a bottom case 9 those are connected with each other. Connecting the top case 8 and the bottom case 9, the case 5 forms into thin flat box shape. The case 5 receives inside the above-mentioned stator 6, the rotor 1, the driven gear 7 and a later-described output gear 15.

The stator 6 includes a frame 10 and a plurality of coils 11. The frame 10 is fixed in the case 5. The coils 11 are mounted on the frame 10. The rotor 1 is formed into disc shape and supported rotatably around an axis of the rotor by the case 5.

Figures 1, 2, 3, 4:
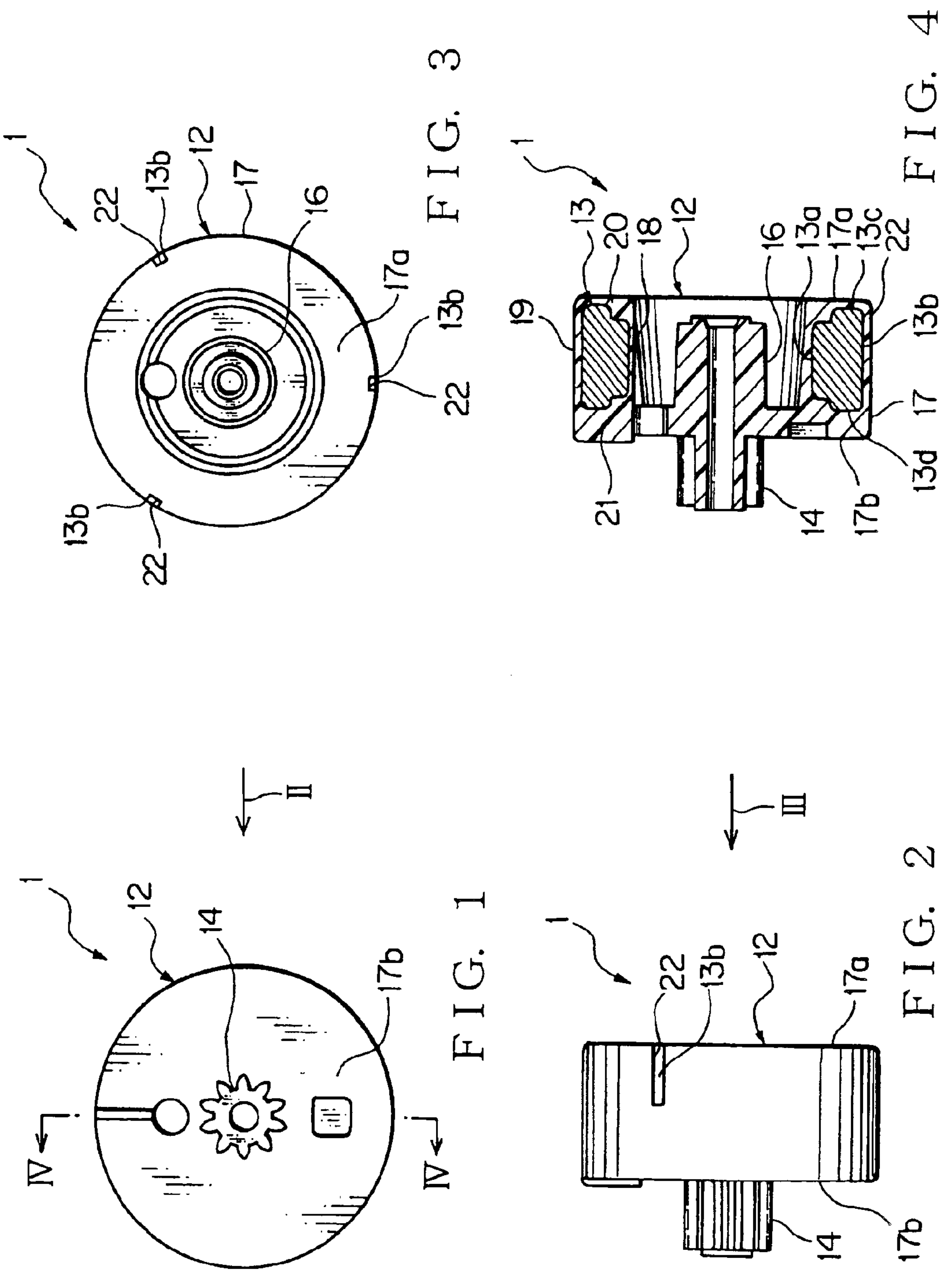
FIG. 1 is a plan view of a rotor of an embodiment according to this invention.
FIG. 2 is a side view when viewed from a direction of an arrow II in FIG. 1.
FIG. 3 is a bottom view of a rotor when viewed from a direction of an arrow III in FIG. 2.
FIG. 4 is a sectional view taken along the line IV—IV in FIG. 1.

The rotor 1, as shown in FIG. 4, is provided with a rotor body 12 and an annular shape magnet 13 fixed on the rotor body 12. A gear 14, shown in FIGS. 1, 2 and 4, is formed integrally with the rotor body 12. The gear 14 is coaxial with the above-mentioned axis. The magnet 13 is magnetized. Detailed structure of the rotor 1 will be described later.

The driven gear 7 is supported rotatably by the case 5. The driven gear 7 engages with the gear 14 of the rotor 1. An output gear 15 is mounted on the output shaft 13. The output gear 15 engages with the driven gear 7.

In the stepping motor 2 structured as mentioned above, the magnetized magnet 13 of the rotor 1 is given rotating magnetic field around the magnet 13 by flowing electric current through the coils 11. Thereby, the magnet 13, i.e. the rotor 1, rotates around the axis. The rotation of the rotor 1 is transmitted through the gear 14 and the driven gear 17 to the output gear 15, and the output shaft 3 rotates.

The rotor 1 includes the rotor body 12 and the annular shape magnet 13 as mentioned above. The magnet 13 is disposed coaxially with the rotor body 12, i.e. both of a shaft portion 16 and an annular portion 17, described later. The magnet 13 is magnetized to form N poles and S poles. The N poles and the S poles are disposed alternately to each other at regular intervals along the outer surface of the magnet 13. The magnet 13 is fixed on the rotor body 12.

The rotor body 12 is made of synthetic resin and formed integrally with the shaft portion 16 and the annular portion 17 coaxial to each other. The above-mentioned gear 14 is formed integrally with the shaft portion 16. The shaft portion 16 is disposed inside the annular portion 17. An inner edge of the annular portion 17 is continued to an outer surface of the shaft portion 16. The annular portion 17, as shown in FIG. 4, is provided with an inner cover portion 18 for covering an inner surface 13*a* of the magnet 13, an outer cover portion 19 for covering an outer surface 13*b* of the rotor 13, a first end cover portion 20 for covering one axial end face 13*c* of the rotor 13, and a second end cover portion 21 for covering the other axial end face 13*d* of the rotor 13. Thus, the rotor body 12 wraps the magnet 13 inside. The first and second end cover portions 20, 21 are continued to both of the above-mentioned inner and outer cover portions 18, 19.

The outer cover portion 19, as shown in FIGS. 2–4, is provided with a plurality of cutouts 22. The cutouts 22 cut off parts of the outer cover portion 19. The outer surface 13*b* of the magnet 13 is exposed through the cutouts 22. In drawings of the embodiment, three cutouts 22 are provided at regular intervals around the annular portion 17 of the rotor body 12.

Figure 5:
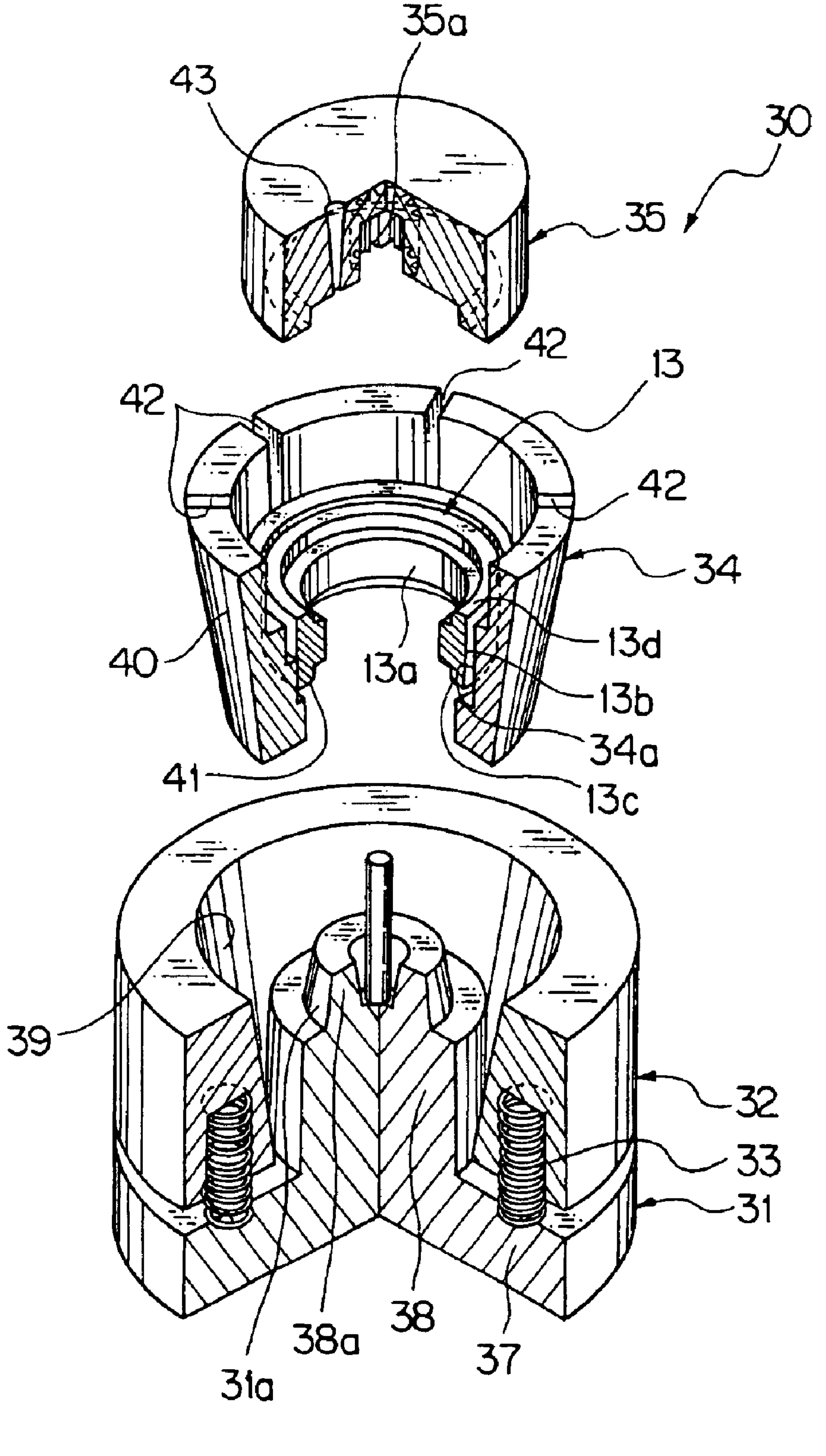
FIG. 5 is an exploded perspective view, showing a molding die used for molding the rotor shown in FIG. 1 by partial section view.
Figure 6:
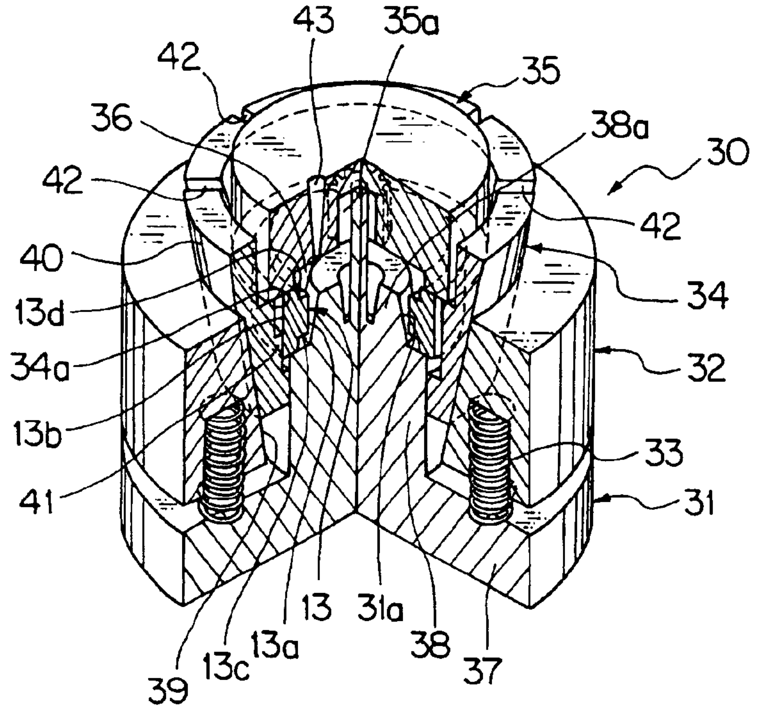
FIG. 6 is a perspective view, showing an assembled molding die of FIG. 5 by partial section view.
Figure 8:
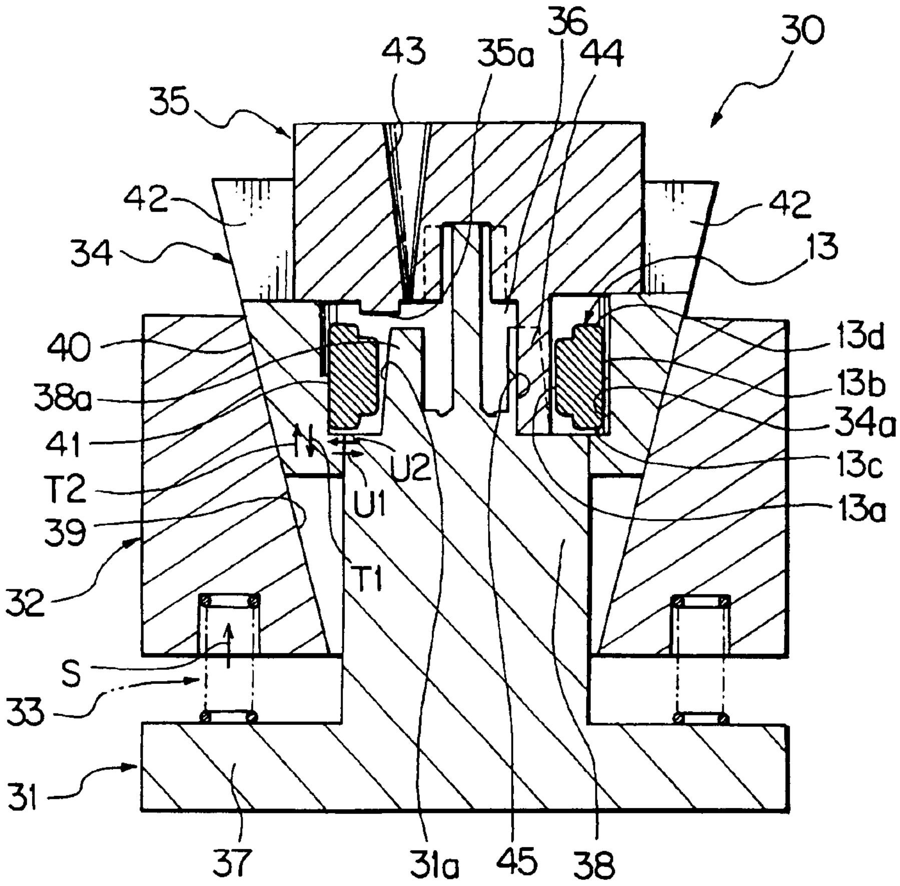
FIG. 8 is a sectional view of the molding die shown in FIG. 6.

The above-mentioned rotor 1 is formed by means of injection molding with a molding die 30 for molding a rotor (simply called "molding die" hereafter) shown in FIG. 8. The molding die 30, as shown in FIGS. 5, 6 and 8, includes a first molding die 31, a supporting die 32, a coil spring 33 as pushing means, a second molding die 34 and a third molding die 35. The first molding die 31, the second molding die 34 and the third molding die 35 are structured to approach and move apart freely with respect to each other. When these molding dies 31, 34 and 35 approach to each other, a cavity 36 corresponding to an external form of the rotor 1 is formed as shown in FIG. 8. When these molding dies 31, 34 and 35 move apart from each other, the rotor 1, which is manufactured by cured synthetic resin injected into the cavity 36, can be extracted from the cavity 36.

The first molding die 31 is formed integrally with a disk portion 37 and a cylinder portion 38. An outer diameter of the disk portion 37 is larger than an outer diameter of the cylinder portion 38. The cylinder portion 38 extends perpendicularly from the disk portion 38. The disk portion 37 and the cylinder portion 38 are coaxial with respect to each other. An end portion 38*a*, spaced from the disk portion 37, of the cylinder portion 38 is formed with a first molding surface 31*a* corresponding to one end face 17*a* of the annular portion 17 of the rotor body 12 (shown in FIGS. 2–4), the inner cover portion 18 and an external form of the shaft portion 16.

The supporting die 32 is formed into a cylindrical shape. An outer diameter of the supporting die 32 is the same as an outer diameter of the disk portion 37. An inner diameter of the supporting die 32 is larger than an outer diameter of the cylinder portion 38. The supporting die 32 is placed above the disk portion 37 so as to receive the cylinder portion 38 through the inside thereof. The supporting die 32 is supported through a coil spring 33 by the first molding die 31. A first tapered surface 39 is formed on an inner surface of the supporting die 32. The first tapered surface 39 of the supporting die 32 is inclined so as to increase the inner diameter of the supporting die 32 gradually in a direction moving from the disk portion 37. In other words, the first tapered surface 39 is inclined so as to increase the inner diameter of the supporting die 32 gradually with respect to approaching the third molding die 35.

The coil spring 33 is disposed between the disk portion 37 and the supporting die 37. The coil spring 33 pushes the disk portion 37 and the supporting die 32 apart from each other. In other words, the coil spring 33 pushes the supporting die 32 toward the third molding die 35 along an arrow S in FIG. 8.

The second molding die 34 is formed into an annular shape. The second molding die 34 is placed inside the supporting die 32 so as to receive the end portion 38*a* of the supporting die 38 through inside thereof. The second molding die 34 is supported by the supporting die 32. A second tapered surface 40 is formed on an outer surface of the second molding die 34. The second tapered surface 40 is inclined so as to increase an outer diameter of the second molding die 34 gradually in in a direction moving from the disk portion 37. In other words, the second tapered surface 40 is inclined so as to increase the outer diameter of the second molding die 34 gradually with respect to approaching the third molding die 35. The second tapered surface 40 contacts the first tapered surface 39. The above-mentioned coil spring 33, the first tapered surface 39 and the second tapered surface 40 structure constitute the adjusting means described in this specification.

The second molding die 34 is formed inside thereof with a molding surface 34*a* which, together with the above-mentioned the first molding surfaces corresponds to the external form of the one end face 17*a* of the annular portion 17 of the rotor body 12. The molding surface 34*a* of the second molding die 34 also corresponds to the external form of the outer cover portion 19 of the rotor body 12.

Figure 7:
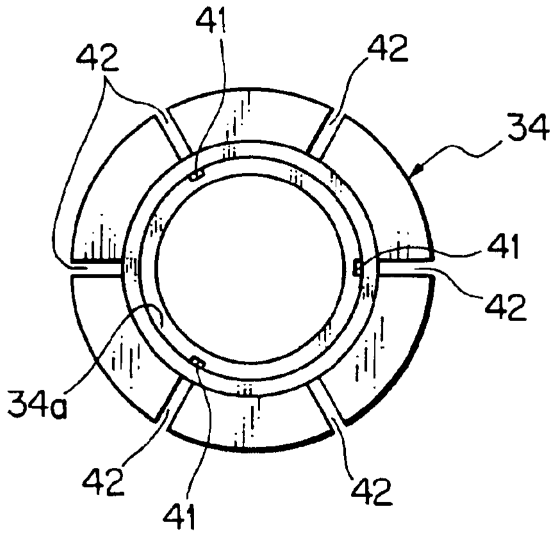
FIG. 7 is a plan view of the second molding die of the molding die shown in FIG. 5.
Figure 11:
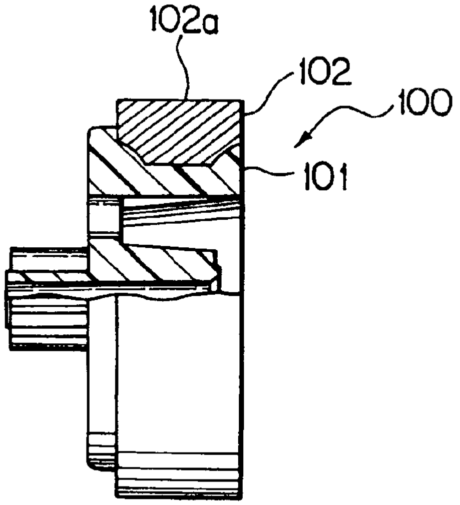
FIG. 11 is a side view of an usual rotor by partial sectional view.

The second molding die 34 has a plurality of support projections 41, as shown in FIG. 7. The support projections 41 are formed so as to project from the second molding surface 34*a* of the second molding die 34. The support projections 41 are disposed at regular intervals around the inner surface of the second molding die 34, as shown in FIG. 7. In FIG. 7, three support projections 41 are provided. The support projections 41 abut on the outer surface 13*b* of the magnet 13 inserted into the cavity 36 so as to clamp the magnet 13 inserted in the cavity 36 therebetween. The support projections 41 support the magnet 13 in the cavity 36.

Furthermore, the second molding die 34 is provided with a plurality of cutouts 42. The cutouts 42 cut off a part of the second molding die 34 so as to communicate between the inner surface and the second tapered surface 40 of the second molding die 34. The cutouts 42 are disposed at regular intervals around the second molding die 34. The cutouts 42 make the second molding die 34 elastically deformable to increase or decrease the inner and outer diameter of the second molding die 34 by cutting off a part of the second molding die 34.

The third molding die 35 is formed into cylindrical shape. An outer diameter of the third molding die 35 is the same as the inner diameter of the second molding die 34. The third molding die 35 is inserted into the inside of the second molding die 34 so as to oppose to the end portion 38*a* of the cylinder portion 38 of the first molding die 31. The third molding die 35 is provided on an end surface thereof opposing to the first molding die 31 with the other end face 17*b* of the annular portion 17 of the rotor body 12 (shown in FIGS. 1, 2 and 4) and a third molding surface 35*a* corresponding to the external form of the gear 14. When the first molding die 31, the second molding die 34 and the third molding die 35 mentioned above are caused to approach each other, the cavity 36 corresponding to the external form of the rotor 1 is formed by the first, second and third molding surfaces 31*a*, 34*a* and 35*a*. The third molding die 35 is provided with a gate 43 for injecting synthetic resin fluidized by heating into the cavity 36.

The above-mentioned molding die 30 has a pin 44 and a recess 45 for positioning the first molding die 31 and the third molding die 35 when the molding dies 31, 34 and 35 approach each other. The pin 44 is formed integrally to the third molding die 35 so as to project toward the first molding die 31. The recess 45 is formed so as to recess from the end surface 38*a* of the cylinder portion 38 of the first molding die 31. When the molding dies 31, 34 and 35 approach each other, the pin 44 goes into the recess 45. The pin 44 fits into the recess 45.

For manufacturing the rotor 1 by the molding die 30 structured as mentioned above, the supporting die 32 is mounted on the first molding die 31 so as to insert the cylinder portion 38 through the inside of the supporting die 32. The second molding die 34 is mounted on the supporting die 32 so as to contact the second tapered surface 40 with the first tapered surface 39. The magnet 13 is clamped between the support projections 41 of the second molding die 34 so as to insert the end portion 38*a* of the cylinder portion 38 of the first molding die 31 into the inside of the magnet 13. Thereafter, the third molding die 35 is inserted into the inside of the second molding die 34.

Thus, the molding dies 31, 34 and 35 are assembled coaxially with respect to each other, and simultaneously the magnet 13 is inserted into the cavity 36. Thereby, the first molding surface 31*a* opposes a space on the inner surface 13*a* and the one end face 13*c* of the magnet 13. The second molding surface 34*a* opposes a space on the outer surface 13*b* and the one end face 13*c* of the magnet 13. The third molding surface 35*a* opposes a space on the other end face 13*d* of the magnet 13.

Thereafter, the synthetic resin fluidized by heating is injected through the gate 43 into the cavity 36. The synthetic resin injected into the cavity 36 pushes the inner surface 13*a* of the magnet 13 outwardly and the outer surface 13*b* of the magnet 13 inwardly. Furthermore, the synthetic resin injected into the cavity 36 pushes the both end faces 13*c* and 13*d* of the magnet 13. After curing the synthetic resin, parting of the molding dies 31,34 and 35 from each other, the rotor 1 is extracted from the cavity 36. Thus, the rotor 1 in which the rotor body 12 has the inner cover portion 18, the outer cover portion 19 and the end cover portions 20, 21 is produced.

According to the embodiment, the inner surface 13*a* of the magnet 13 is covered by the inner cover portion 18 of the rotor body 12, and the outer surface 13*b* of the magnet 13 is covered by the outer cover portion 19 of the rotor body 12. Furthermore, the both end faces 13*c*, 13*d* are covered by the end cover portions 20, 21 of the rotor body 12.

The magnet 13 is supported in the cavity 36 by the support projections 41 of the second molding die 34. In the cavity 36, the first molding surface 31*a* of the first molding die 31 opposes a space on the inner surface 13*a* of the magnet 13, and the second molding surface 34*a* of the second molding die 34 opposes a space on the outer surface 13*b* of the magnet 13. The first molding surface 31*a* and the second molding surface 34*a* oppose a space on the one end face 13*c* of the magnet 13, and the third molding surface 35*a* opposes a space on the other end face 13*d* of the magnet 13.

When the rotor 1 is molded, the fluidized synthetic resin pushes the inner surface 13*a* of the magnet 13 outwardly and the outer surface 13*b* of the magnet 13 inwardly. Furthermore, when the rotor 1 is molded, the fluidized synthetic resin pushes the both end faces 13*c* and 13*d* of the magnet 13. Thereby, when the rotor 1 is molded, the magnet 13 can be prevented from expanding or shrinking. Therefore, when the rotor 1 is molded, the magnet 13 can be prevented from cracking so that manufacturing yield can be prevented from deteriorating.

The end cover portions 20, 21 are continued to the both of the inner cover portion 18 and the outer cover portion 19. Thereby, the first molding surface 31*a* and the second molding surface 34*a* opposes a space on the one end face 13*c* of the magnet 13, and the third molding surface 35*a* opposes a space on the other end face 13*d* of the magnet 13 so that, when the rotor 1 is molded, pressures pushing the inner and outer surfaces 13*a*, 13*b* and the end faces 13*c*, 13*d* can be the same.

The coil spring 33 pushes the supporting die 32 supporting the second molding die 34 toward the third molding die 35 along an arrow S in FIG. 8. The supporting die 32 is provided on the inner surface thereof with the first tapered surface 39 inclined so as to increase the inner diameter of the supporting die 32 gradually in proportion to approaching to the third molding die 35. The second molding die 34 is provided on the outer surface thereof with the second tapered surface 40 inclined so as to increase the outer diameter of the second molding die 34 gradually in proportion to approaching to the third molding die 35.

Thereby, when the third molding die 35 is fixed on the first molding die 31, the coil spring 33 pushes the second molding die 34 through the supporting die 32 to move apart from the disk portion 37 of the first molding die 31 along an arrow T1. The second molding die 34 is fixed in a direction of the arrow T1 by the third molding die. Therefore, by an effect of coupling of the first and second tapered surfaces 39, 40 inclined as mentioned above, the second molding die 34 is pushed so as to decrease the inner diameter along an arrow U1 by the pushing force of the coil spring 33.

When the magnet 13 is inserted into the second molding die 34, the inner diameter of the second molding die. 34 is decreased by the pushing force of the coil spring 33 so that the support projections 41 abut the outer surface 13*b* of the magnet 13. Therefore, even if the magnet 13 is smaller than the space between the support projections 41, the magnet 13 can be supported securely in the cavity 36. In this case, the first molding surface 31*a* also opposes a space on the inner surface 13*a* of the magnet 13, and the second molding surface 34*a* also opposes a space on the outer surface 13*b* of the magnet 13.

If the magnet 13 is larger than the space between the support projections 41, when the magnet 13 is pushed into the space between the support projections 41, the second molding die 34 is deformed so as to increase the inner diameter along an arrow U2 in FIG. 8. The first and second tapered surfaces 39, 40 slant as mentioned above so that the supporting die 32 is moved toward the disk portion 37 of the first molding die 31 along an arrow T2 against the pushing force of the coil spring 33 and the inner diameter of the second molding die 34 is increased along an arrow U2. Thus, even if the magnet 13 is larger than the space between the support projections 41, the magnet 13 can be supported securely in the cavity 36.

The adjusting means structured by the coil spring 33, the first tapered surface 39 and the second tapered surface 40 can securely increase and decrease the inner diameter of the second molding die 34 in accordance with the outer diameter of the magnet 13. Thereby, even if the outer diameter of the magnet 13 is slightly increased or decreased by tolerance, the magnet 13 can be supported securely in the cavity 36 in a condition in which the first molding surface 31*a* opposes a space on the inner surface 13*a* and the second molding surface 34*a* opposes a space on the outer surface 13*b*. Therefore, when the rotor 1 is molded, the magnet 13 can be prevented from cracking so that manufacturing yield of the rotor 1 can be more securely prevented from deteriorating.

The above-mentioned embodiment describes an example of a stepping motor. It is easily understood that this invention can be applied to other various types of motors.

In the above-mentioned embodiment, the rotor 1 includes the inner cover portion 18, the outer cover portion 19, and the first and second end cover portions 20, 21. According to this invention, it is easily understand that the rotor 1 may include only the inner cover portion 19 and the outer cover portion 19 excluding the first and second cover portions 20, 21. In this case, when the rotor 1 is molded, the magnet 13 also can be prevented from cracking so that manufacturing yield of the rotor 1 can be prevented from deteriorating.

Having now fully described the invention, it will be apparent to one of ordinary skill in the art that many changes and modifications can be made thereto without departing from the scope of the invention as set forth herein.

What is claimed is:

1. A molding die set for molding a rotor for rotating an output shaft of a motor having a rotor body made of synthetic resin, and a magnet formed of an annular shape and magnetized and fixed on said rotor body, the rotor body having an inner cover portion for covering an inner surface of the magnet and an outer cover portion for covering an outer surface of the magnet, said molding die set comprising:

a first molding die having a first molding surface opposing a space adjacent a radially inner surface of a magnet installed in the molding die set; and a second molding die having a second molding surface opposing a space adjacent a radially outer surface of the magnet, the second molding die including a support projection projecting from the second molding surface for supporting the magnet in the molding die set by abutting the radially outer surface of the magnet in a cavity surrounded by the first molding surface and the second molding surface, wherein the rotor has end-face cover portions extending continuously between the inner cover portion and the outer cover portion for completely covering the end faces of the magnet, wherein the first molding surface and the second molding surface cooperate to oppose respectively a space adjacent to and extending completely across, one end face of the magnet, said molding die set further comprising a third molding die having a third molding surface opposing a space adjacent to and extending completely across, the other end face of the magnet.

2. The molding die set for molding a rotor according to claim 1, wherein the second molding die is formed into annular shape and provided at an inner surface thereof with the second molding surface and has adjusting means for increasing or decreasing an inner diameter of the second molding die in accordance with an outer diameter of the magnet.

3. The molding die set for molding a rotor according to claim 2, further comprising an annular-shape supporting die supporting the second molding die and being supported by the first molding die, whereby the adjusting means includes:

pushing means for pushing the supporting die toward the third molding die;

a first tapered surface inclined upward so that an inner diameter of the supporting die gradually increases in relation to approaching the third molding die on an inner surface of the supporting die; and a second tapered surface inclined upward so that an outer diameter of the second molding die gradually increases in relation to approaching the third molding die on an outer surface of the second molding die and contacting with the first tapered surface.

* * * * *